UNITED STATES PATENT OFFICE.

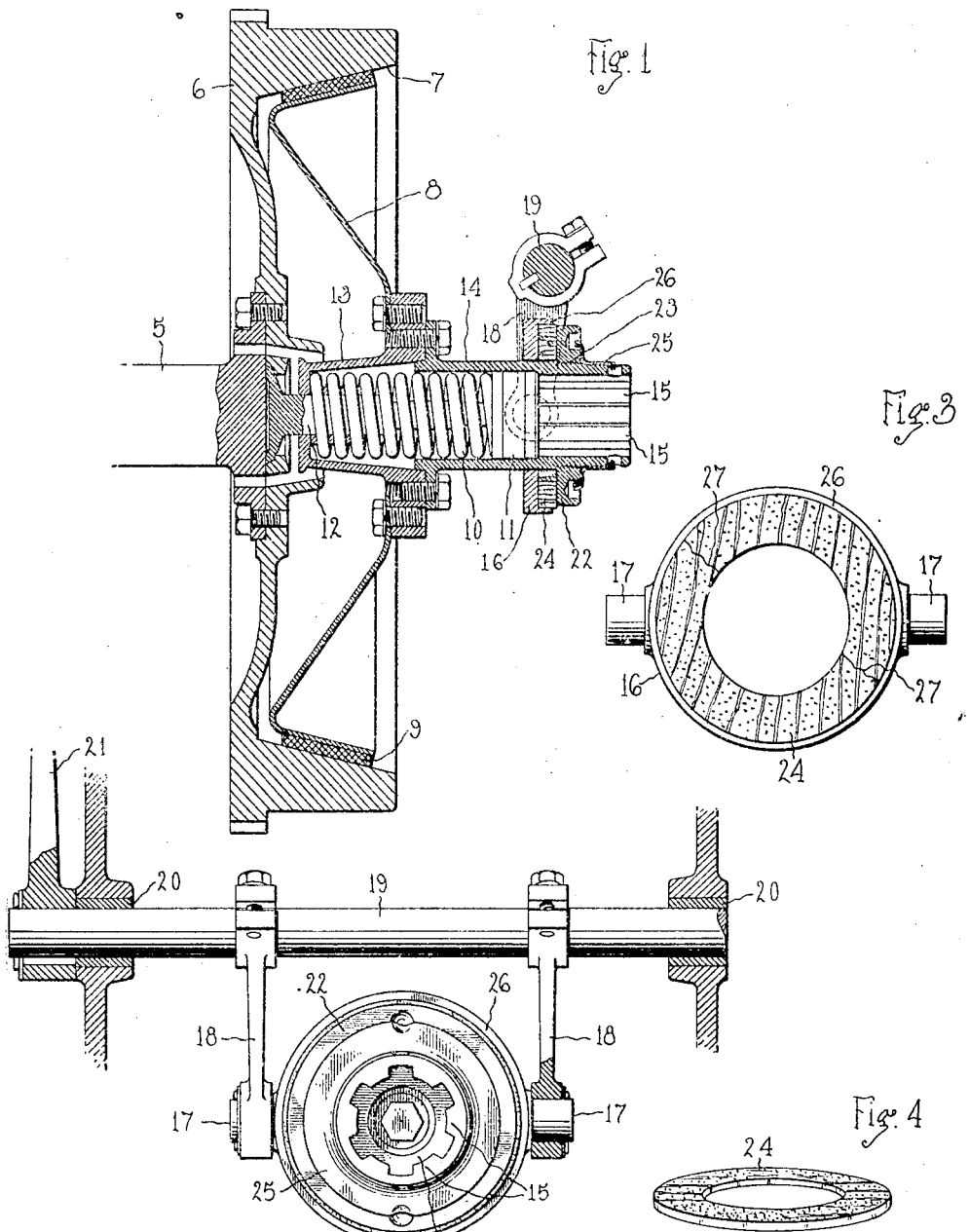

ALFRED T. STURT, OF NEW YORK, N. Y., ASSIGNOR TO GENERAL MOTORS CORPORATION, OF DETROIT, MICHIGAN, A CORPORATION OF DELAWARE.

CLUTCH-RELEASING MECHANISM FOR AUTOMOBILES.

1,336,000.  Specification of Letters Patent.  Patented Apr. 6, 1920.

Application filed June 4, 1919. Serial No. 301,707.

*To all whom it may concern:*

Be it known that I, ALFRED T. STURT, a citizen of the United States, and resident of New York city, New York county, State of New York, have invented certain new and useful Improvements in Clutch-Releasing Mechanism for Automobiles, of which the following is a specification.

My invention relates to clutch mechanism designed to be used in connection with the power systems of automobiles, motor trucks and similar self-propelled vehicles.

An object of my invention is to provide improved means for operating clutches used in connection with the engines of self-propelled vehicles, and wherein a construction is provided whereby a wearing member through which the clutch is operated may be removed when worn, and a new wearing member substituted therefor, with a minimum of trouble and expense.

A further object of my invention is to provide an improved form of wearing member for use in connection with clutches of the type above referred to; and which wearing member will be more durable, and better adapted for the service for which it is employed, than has heretofore commonly been the case in clutch mechanisms of the type to which my invention relates.

A further object of my invention is to provide certain improvements in and relating generally to clutch operating mechanism of the type in which a driven clutch member is normally held in engagement with a driving clutch member by means of a spring, but which driven member may be moved out of engagement with the driving member against the action of the spring to thereby disconnect the mechanism driven through the clutch from the engine or other motor whereby the vehicle is operated.

With the above and other objects of invention in view, my invention consists in the improved clutch operating mechanism and subordinate parts and auxiliary features thereof illustrated in the accompanying drawing and hereinafter described and claimed, and in such variations and modifications thereof, within the scope of the concluding claims, as will be obvious to those skilled in the art to which my invention relates.

Referring to the drawing wherein the preferred embodiment of my invention is illustrated:

Figure 1 is a view showing clutch mechanism equipped with operating means made in accordance with my invention.

Fig. 2 is a view showing the clutch operating mechanism shown in Fig. 1 in end elevation, and as seen from a position to the left of said figure;

Fig. 3 is a view showing the annular clutch mechanism collar included in my invention by itself in elevation, and, Fig. 4 is a view showing the wooden wearing member of my invention in perspective.

Referring to the drawing, the reference numeral 5 designates a driving shaft, which may be the crank shaft of an engine or the driving shaft of a motor whereby the vehicle with which the clutch mechanism is used is driven; and 6 designates a fly wheel or equivalent member driven from the shaft 5 and providing in effect a driving clutch member from which motion is communicated to the driving wheels of the vehicle through the clutch mechanism hereinbefore referred to and hereinafter described in detail.

The fly wheel 6 is provided with a conical recess 7, and the reference numeral 8 designates a clutch member having a wearing face or clutch lining 9, said clutch member being forced to the left, Fig. 1, by means of a spring 10 one end of which acts against a head 11 carried by a tension member 12 the left-hand end of which is secured in a fixed position between the fly wheel 6 and the end of the driving shaft 5 in the embodiment of my invention illustrated. The left-hand end of the spring 10 acts against an abutment provided by the end wall of a hub 13 carried by and rotatable with the clutch member 8; from which it will be appreciated that the spring 10 will act to force the member 8 to the left and maintain a driving engagement between the fly wheel or driving clutch member 6 and the driven clutch member 8 through the friction clutch lining 9.

Operatively connected with the driven clutch member 8 and rotatable therewith is a rotatable member 14 shown as in the form of a sleeve which, in connection with the hub 13, provides a housing for the spring 10 and a guide for the head 11, and which member 14 is operatively connected with a driving shaft through which the wheels of the vehicle are operated; the connection between the said member and the driving shaft being made through internal lugs or teeth 15 carried by said member 14, and which lugs engage slots at the end of the driving shaft. The driving shaft, however, is not shown, as the same forms no part of the invention to which this present application relates.

The operating member 14 is movable along its axis from which it follows that when said member is moved to the right, Fig. 1, the clutch member 8 will be moved in a corresponding direction, and the driving connection between the fly wheel 6 and said member will be interrupted by the movement of the lining 9 away from the inclined wall of the recess 7 in the fly wheel, thus interrupting the driving action and permitting the engine to operate without driving the vehicle.

The clutch operating member 14 is moved in opposition to the action of the spring 10 by means of a clutch operating collar 16 shown separate and by itself in Fig. 3, which collar surrounds the member 14 and is provided with oppositely located trunnions 17, 17; which trunnions are supported in bearings at the lower ends of arms 18, 18 carried by an oscillating shaft 19 the ends of which are supported in bearings 20, 20; and which shaft 19 is operated through an arm 21 which in turn is operated from the driver's seat through suitable clutch operating mechanism, as is usual in self-propelled vehicles.

The clutch operating member 14 is provided with an abutment 22 with which the clutch operating collar 16 coöperates, said abutment being secured to the member 14 in a non-permanent manner, as through screw threads 23 as best shown in Fig. 1; from which it follows that the said abutment may be moved to the right, Fig. 1, and away from the clutch operating collar 16, thus providing for the renewal of the wearing member or element 24 interposed between the clutch operating collar and the said abutment without disassembling the parts further than moving the abutment sidewise along the member 14 to a sufficient extent to permit the worn wearing member to be removed, and a new one to be substituted therefor.

The abutment in question is locked in place by means of a suitable locking ring 25 or in any suitable way, as will be appreciated, and it will also be appreciated that constructions other than the screw threaded connection above referred to may be provided for securing the abutment to the clutch operating member in a non-permanent manner, so that it can be moved to one side to permit the placing of a new wearing member between the clutch operating collar 16 and the abutment 22.

My invention contemplates the use of a particular kind of wearing member 24 between the annular clutch operating collar 16 and the abutment 22, said member being made of wood treated with a lubricating material such, for example, as oil and graphite; the wooden member thus provided being so formed that the grain of the wood extends at right angles to the surface of the abutment 22 and to the clutch operating collar 16, or, as otherwise stated, at right angles to the plane of the clutch operating collar, so that the end of the grain of the wood contacts with the abutment 22 when the device is in use.

This wooden wearing member is located within an annular recess formed by an annular peripherally extending ledge 26 carried by the clutch operating collar, to thereby hold the said wearing member securely in place when the parts are in use.

The wooden wearing member above referred to is obviously annular in form, and when the same has been worn out in use, it may be readily broken up as by the use of a chisel and removed from the recess within which it is located; after which a new wearing member may be substituted therefor, it being appreciated that the abutment 22 will be moved to the right along the member 14 in order to permit access to the wearing member when it is to be removed and another substituted therefor.

The new wearing member before being placed within the recess in the clutch operating collar 16 will be broken, for example, at the places indicated by the lines 27, 27, Fig. 3, thus permitting the new wearing member to be put in place surrounding the driving connection between the engine and the driving wheels without disconnecting said connection. The parts of the wearing member after being properly matched and inserted within the recess provided in the annular clutch operating collar will be prevented from falling from the recess by the peripheral wall 26 and by the abutment 22, it being appreciated that when the device is in use the exposed face of the wearing member will be in constant engagement with the abutment 22, or will lie very close to the surface of said abutment if stops are provided for preventing actual contact between the wearing member and the abutment except at such times as the clutch is to be operated to interrupt the driving action of the engine.

Having thus described and explained my invention, I claim and desire to secure by Letters Patent:

1. In clutch operating mechanism of the class described, a rotatable and axially movable member operatively connected with a clutch member to move the same; a spring acting upon said member to thereby normally maintain a driving connection between the same and a second clutch member; an annular clutch operating collar surrounding said rotatable member; an abutment carried by said rotatable member and against which said collar acts to move said member along its axis, and which abutment is connected with said rotatable member in a non-permanent manner, so that it may be moved away from said collar; a renewable wearing member interposed between said collar and said abutment; oppositely located trunnions carried by said collar; an oscillating shaft extending transversely of said rotatable member; and arms carried by said shaft, and having bearings at their lower ends within which the trunnions aforesaid are supported.

2. In clutch operating mechanism of the class described, a rotatable and axially movable member operatively connected with a clutch member to move the same; an annular clutch operating collar surrounding said rotatable member; an abutment carried by said rotatable member and against which said collar acts to move said member along its axis, and which abutment is connected with said rotatable member in a non-permanent manner, so that it may be moved away from said collar; a renewable wearing member interposed between said collar and said abutment; and operating means whereby said collar may be moved toward said abutment to thereby move said rotatable member along its axis.

3. In clutch operating mechanism of the class described, a rotatable and axially movable member operatively connected with a clutch member to move the same; an annular clutch operating collar surrounding said rotatable member and having an annular recess formed therein; an abutment carried by said rotatable member and connected therewith in a non-permanent manner so that it may be moved away from said collar; a renewable wearing member located within the recess aforesaid and interposed between said clutch operating collar and said abutment; and operating means whereby said collar may be moved toward said abutment to thereby move said rotatable member along its axis.

4. In clutch operating mechanism of the class described, a rotatable and axially movable member operatively connected with a clutch member to move the same; an annular clutch operating collar surrounding said rotatable member and having an annular recess formed therein; an abutment carried by rotatable member and connected therewith in a non-permanent manner so that it may be moved away from said collar; a wearing member made of wood treated with a lubricating material located within said recess and between said clutch operating collar and said abutment; and operating means whereby said collar may be moved toward said abutment to thereby move said rotatable member along its axis.

5. In clutch operating mechanism of the class described, a rotatable and axially movable member operatively connected with a clutch member to move the same; an annular clutch operating collar surrounding said rotatable member and having an annular recess formed therein; an abutment carried by said rotatable member; a renewable wearing member made of wood treated with a lubricating material located within said recess and between said clutch operating collar and said abutment, said wearing member being arranged so that the grain of the wood extends at right angles to the plane of said collar; and operating means whereby said collar may be moved toward said abutment to thereby move said rotatable member along its axis.

6. In clutch operating mechanism of the class described, a rotatable and axially movable member operatively connected with a clutch member to move the same; an annular clutch operating collar surrounding said rotatable member; an abutment carried by said rotatable member; a renewable wearing member made of wood treated with a lubricating material carried by said clutch operating collar; and operating means whereby said collar may be moved toward said abutment to thereby move said rotatable member along its axis.

7. In clutch operating mechanism of the class described, a rotatable and axially movable member operatively connected with a clutch member to move the same; an annular clutch operating collar surrounding said rotatable member and having an annular recess formed therein; an abutment carried by said rotatable member; a renewable wearing member located within the recess aforesaid and interposed between said clutch operating member and said abutment; means whereby said clutch operating member and said abutment may be moved apart from one another to thereby permit the renewable wearing member aforesaid to be removed from its recess and another wearing member substituted therefor; and operating means whereby said collar may be moved toward said abutment to thereby move said rotatable member along its axis.

In testimony whereof I affix my signature.

ALFRED T. STURT.